United States Patent [19]

Higashihara

[11] Patent Number: 4,539,671
[45] Date of Patent: Sep. 3, 1985

[54] RECORDING AND/OR REPRODUCING APPARATUS FOR A DISK

[75] Inventor: Teruaki Higashihara, Tokyo, Japan
[73] Assignee: Sony Corporation, Tokyo, Japan
[21] Appl. No.: 532,842
[22] Filed: Sep. 16, 1983
[30] Foreign Application Priority Data

Sep. 24, 1982 [JP] Japan .................. 57-144435[U]
Sep. 24, 1982 [JP] Japan .................. 57-144436[U]

[51] Int. Cl.³ ............................................. G11B 3/36
[52] U.S. Cl. ................................. 369/213; 369/75.1; 369/270
[58] Field of Search ..................... 369/213, 75.1, 270

[56] References Cited

U.S. PATENT DOCUMENTS

| | | | |
|---|---|---|---|
| 3,980,308 | 9/1976 | Camerik et al. | 369/270 |
| 4,135,721 | 1/1979 | Camerik | 369/270 |
| 4,232,870 | 11/1980 | Iemenschot | 369/270 |
| 4,252,327 | 2/1981 | Elliott et al. | 369/213 |
| 4,340,955 | 7/1982 | Elliott et al. | 369/213 |
| 4,420,830 | 12/1983 | Green | 369/270 |

Primary Examiner—Steven L. Stephan
Attorney, Agent, or Firm—Lewis H. Eslinger; Alvin Sinderbrand

[57] ABSTRACT

A disk recording and/or reproducing apparatus includes a cover mounted on a main body for movement between open and closed positions, a disk presser unit operably mounted on the cover of the apparatus such that it cooperates with a spindle drive unit for holding the disk, a holder cover attached to the cover for movement therewith, and a controller to control the holder to permit movement of the disk presser when the cover is in the closed position, so that when the spindle unit and disk table are moved radially relative to the disk, the presser unit is moved as well.

13 Claims, 6 Drawing Figures

RECORDING AND/OR REPRODUCING APPARATUS FOR A DISK

This invention relates to a recording and/or reproducing apparatus for a disk for audio or the like signals, according to which the audio signals may be recorded on or reproduced from a disk used as recording medium. More particularly, it relates to a movable disk type recording and/or reproducing apparatus in which a disk table rotatably carrying said disk is moved radially of the disk for changing the relative position between said disk and fixed recording and/or reproducing means such as an optical pick-up unit for recording the desired information on predetermined tracks of the disk or tracing or scanning the recorded tracks of the disk.

PRIOR ART AND ITS PROBLEMS

There is known in the art a recording and/or reproducing apparatus for audio or for the like signals, according to which the audio signals are recorded on a disk and read out or reproduced therefrom by a laser beam radiated towards said disk from a suitable optical pick-up unit.

The conventional recording and/or reproducing apparatus of the type described above is so arranged and constructed that the optical pick-up unit radiating the laser beam to the rotating disk is moved radially of the disk for sequentially scanning the recording tracks. In the known apparatus, in order to prevent the laser beam from leaking to the outside during recording or reproduction, a recess adapted for housing a disk provided on a disk table is covered by a rotatable disk cover. As one of the aforementioned scanning arrangements, the optical pick-up unit may be mounted fixedly on a chassis and the disk table moved radially to the disk. In such arrangement, the disk cover is opened to an obliquely upward position about a hinge provided close to one side of the disk recess. Thus the disk may be inserted or removed only from a position obliquely above the disk table. However, when the disk is inserted into the apparatus further than is necessary, the center spindle unit of the disk table tends to be out of alignment with the center opening of the disk, resulting in a complicated disk mounting operation.

It is also required in the recording and/or reproducing apparatus that, when the disk cover is opened for insertion or removal of the disk, the disk is inserted on the disk table and the disk cover is again closed for playback, the disk table is situated at the initial position during cover closure and the disk presser mounted on the disk cover is correctly registered with the disk table for positively pressing the disk from above.

It is therefore an object of the present invention to provide a recording and/or reproducing apparatus wherein the disk presser mounted on the disk cover is movable in unison with the center spindle during driving for recording and/or reproduction and wherein said disk cover is accurately maintained at a position in register with the center spindle unit when the disk cover is opened.

It is a further object of the present invention to provide a recording and/or reproducing apparatus wherein accurate insertion of the disk on the disk table may be facilitated.

It is another object of the present invention to provide a recording and/or reproducing apparatus wherein the disk table movement is not obstructed in the course of recording or reproduction.

DESCRIPTION OF THE PREFERRED EMBODIMENT

Figure 1:
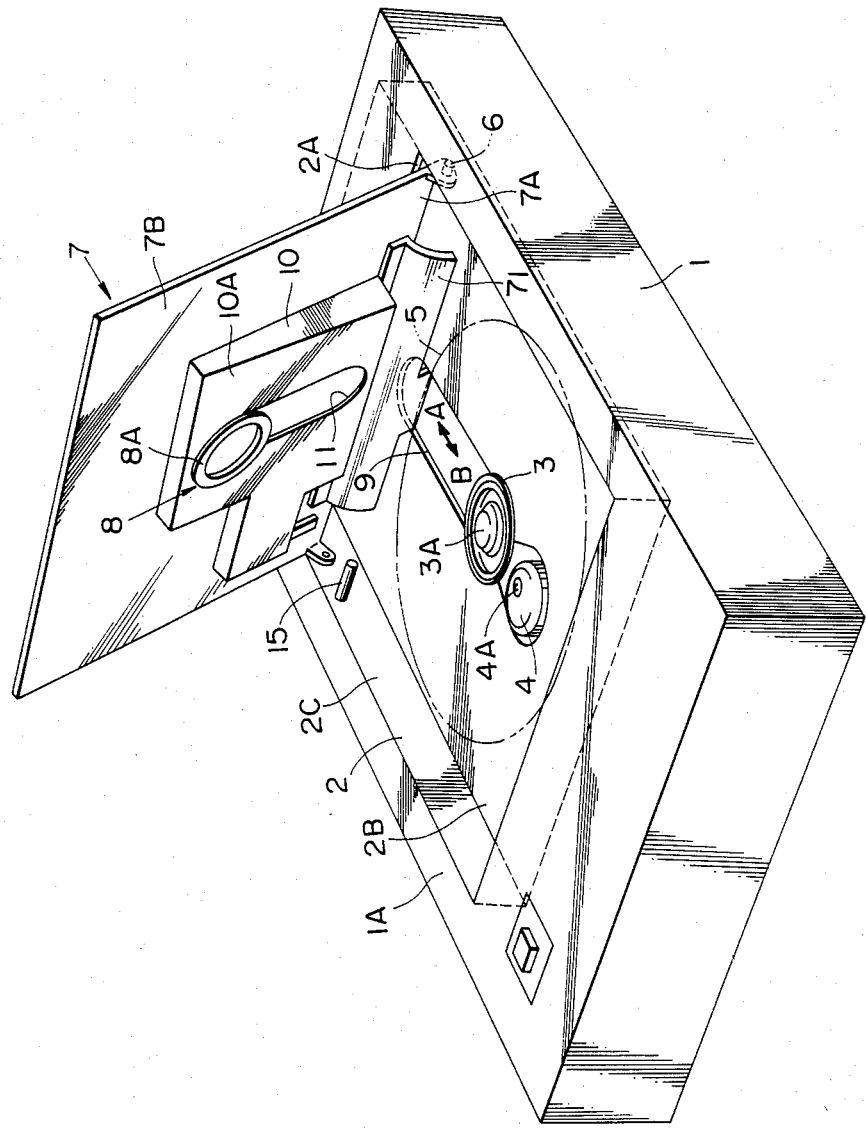
FIG. 1 is a diagrammatic perspective view showing the recording and/or reproducing apparatus with the rotary cover of the disk plate opened.

The recording and/or reproducing apparatus for a disk according to the present invention is now described by referring to the accompanying drawings. On an upper portion 1A of a main body 1, there is formed a recess 2 for accommodating a disk 5. An object lens 4A of an optical pick-up unit 4 and a disk table 3 are mounted in the recess 2, said object lens facing upwards when seen in FIG. 1. The optical pick-up device 4 and the disk table 3 are projected from an elongated opening 9 in the bottom wall 2B and the disk table 3 is adapted to be movable in said slot 9 in the direction shown by arrow marks A, B by feed means such as stepping motor, not shown, so that the tracks on the disk 5 carried on the table 3 may be confronted by said object lens as a result of such radial movement of the disk 5.

A cover 7 adapted for closing the recess 2 has its base portion 7A pivotally attached by a hinge 6 in the vicinity of a side 2A of the recess 2. An L-shaped holder cover 10 formed as a box of smaller thickness is mounted to the inner surface 7B of the cover 7. An elongated opening 11 is formed in the lower wall 10A of the holder cover 10 and a presser plate portion 8A of a disk presser 8 is mounted in said opening 11 for projecting outwardly therefrom and moving longitudinally of the opening 11.

Figure 2:
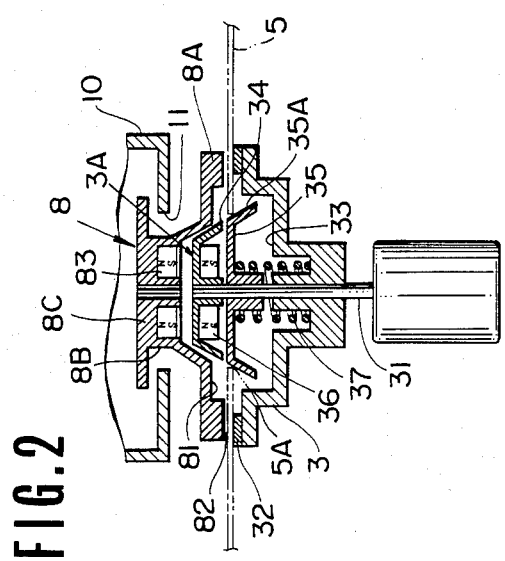
FIG. 2 is a longitudinal sectional view showing disk chucking means employed in the apparatus shown in FIG. 1.

Reference is now had to FIG. 2 for describing means for chucking the disk by the disk presser 8 and the disk table 3.

The disk presser 8 has a cylindrical portion 8B, an upper holding ring 8C and the presser plate portion 8A extending downwardly from the cylindrical portion 8B. The presser plate 8A is formed with a downwardly directed central recess 81 and an axially projecting peripheral disk abutment surface 82. A magnet 83 is secured to the bottom of the recess 81. The cylindrical portion 8B has an outside diameter to pass through said opening 11, whereas the ring 8C has a diameter larger than the width of the opening 11 so that the presser 8 is withheld by the holder cover 10. In the illustrated embodiment, the disk table 3 has its central portion secured to a motor output shaft 31. An annular buffer member 32 such as, a felt ring, is attached to the upper peripheral surface of the disk table 3 whereas a central recess 33 is formed on the upper surface of the disk table 3. A magnet mounting plate 34 and a disk centering plate 35 making up a center spindle unit 3A are mounted to said output shaft 31 above disk table 3. The magnet mounting plate 34 is secured to the end of output shaft 31 and a magnet 36 facing to the magnet 83 of the disk presser 8 is mounted to the magnet mounting plate 34. The disk centering plate 35 has a tapered peripheral portion 35A engaging in a central opening 5A of the disk 5. The centering plate 35 is loosely mounted on the output shaft 31 for movement vertically between the disk table 3 and the magnet mounting plate 34. A spring 37 is interposed between the centering plate 35 and the disk table 3. The magnets 83, 36 are of opposite polarity and mounted in confronting relation so as to be attracted towards one another. With the disk chucking means described in the foregoing, the disk 5 has its center hole 5A adapted to the spindle unit 3A of the disk table 3 whereby the disk placed on the centering plate 35 is centered by interfitting of the magnet mounting plate 34 with the peripheral tapered portion 35A of the centering plate 35. The pivoted cover 7 is then closed so that the disk presser 8 is pressed from above the disk 5 and into engagement with the center spindle unit 3A. The magnets 83, 36 are confronted to one another on both sides of the disk presser 8, and the disk abutment surface 82 of the disk presser 8 is pressed against the upper surface of the disk 5 under the resulting magnetic attraction so that the centering plate 35 is depressed against the resiliency of the spring 37 until the lower surface of the disk 5 is pressed on the buffer member 32 of the disk table 3 and the disk is clamped between the abutment surface 82 and the buffer member for chucking.

Although not shown, the feed means for the disk table 3 is intended for shifting the disk table 3 in the direction shown by arrow marks A-B in FIG. 1 for linear scanning movement of the optical pick-up unit 4 with respect to the recording tracks of the disk 5, and may be typically constituted by a stepping motor and associated disk driving means.

Reference is now made to FIGS. 1 and 3 through 5 for description of holding means for disk presser 8 and control means for permitting movement of disk presser 8 through closure of the rotary cover 7.

The disk presser 8 is maintained by a holder 12 at a position corresponding to the initial position of disk table 3 when the rotary cover 7 is opened. It is also positively adapted to the disk table 3 when the pivoted cover 7 is closed. The disk presser 8 is designed to be movable relative to holder 12 when the pivoted cover 7 is closed. The holder 12 is formed as a flat plate having upright folded portions 121, 122 on both sides thereof and a central hole 123 opened at 123A on a leading side 12A. On both sides of the opening 123A, the leading side 12A is formed with a pair of upright bent portions 124, 124. Towards base side 12B, a supporting shaft 126 carried between supporting members 125, 125 projectedly mounted to an inner surface 7B of the rotary cover 7 is passed through openings in the upright folded portions 121, 122 and carried rotatably to permit vertical movement of the leading side of the holder 12. An elongated central hole 127 is bored through the upright folded portion 121 for accommodating a pin 128 as later described.

The hole 123 is of such size as to permit the passage of the cylindrical portion 8B of the disk presser 8 but to obstruct the passage of the holding ring 8C. The bent portions 124, 124 are so arranged and constructed that, when the leading side 12A of the holder 12 is lifted, that is, when the cover 7 is opened, the bent portions 124, 124 are engaged with the holding ring 8C of the disk presser 8 for holding the presser 8 within the hole 123 and, when the leading side 12A is depressed, that is, when the rotary cover 7 is closed, and thus the disk presser 8 interfits with the disk table 3 through magnetic attraction for chucking the disk 5, the bent portions 124, 124 are receded to a lower position unengageable with the holding ring 8C, in a manner so that the ring 8C may be moved outwards from the opening 123A of the hole 123.

The numeral 13 designates a holder arm pivoted for rotation halfway by a rotary supporting shaft 14 and having the aforementioned pin 128 at one end 13A, said pin 128 extending horizontally and substantially parallel to the supporting shaft 14 for engaging in the opening 127 in the upright folded portion 121 of the holder 12. The holder arm 13 has an abutting portion 131 at the other end 13B for engaging with a pin 15 fixedly mounted to the side wall 2C of the recess 2. In the embodiment illustrated, the holder arm 13 is crank-shaped in plan view and has upright folded portions 132, 133 having through-holes for passage of the supporting shaft 14. The aforementioned pin 128 is mounted for projecting from the outer surface of the upright folded portion 133.

Figure 3:
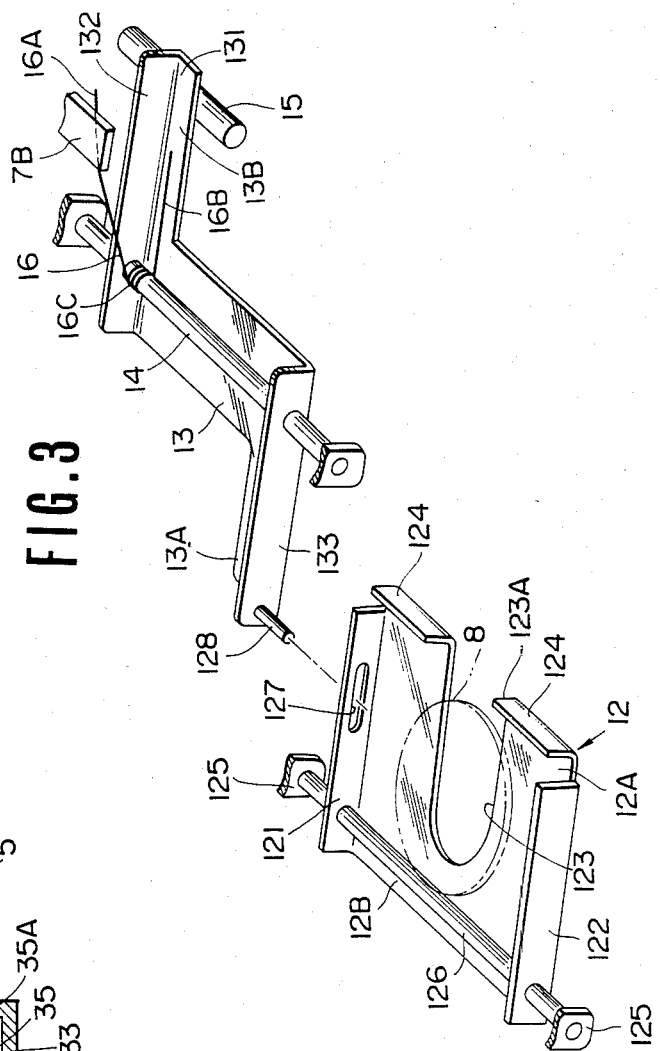
FIG. 3 is an exploded perspective view showing disk presser holding means.
Figure 4:
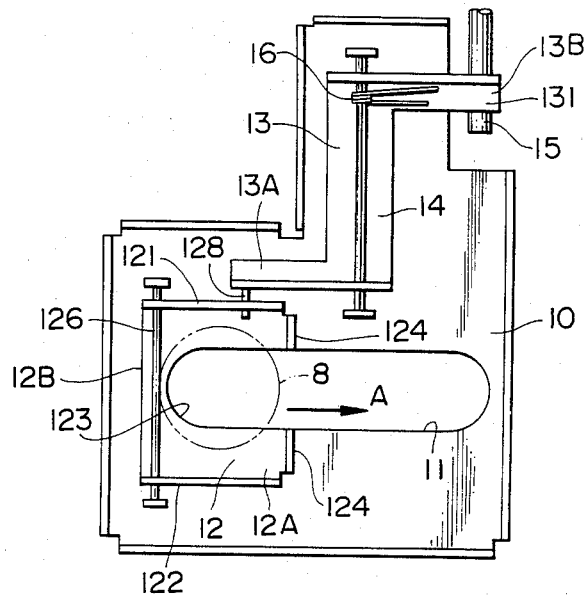
FIG. 4 is a plan view showing disk player holding means.

The numeral 16 designates a coil spring having a central part 16C coiled about supporting shaft 14 and retained at terminal parts 16A, 16B by the inner surface 7B of the cover 7 and by the holder arm 13, respectively, whereby the holder arm 13 is urged to rotate clockwise about supporting shaft 14 in FIGS. 3 and 4.

When the cover 7 is opened for insertion, removal or exchange of the disk 5, the disk table 3 has been returned to its initial position by the operation of sensing and driving means sensing the opening of the cover 7 and driving the table shifting means into operation. Thus the disk presser 8 is also returned to the initial position of the disk table 3, that is, to the terminal position indicated by arrow mark B in FIG. 1, to be engaged and introduced into the hole 123 of the holder 12.

Since the abutting portion 131 of the holder arm 13 is in abutting contact with the fixed pin 15, the holder 12 has its leading side 12A pressed down by the pin 128.

Figure 5:
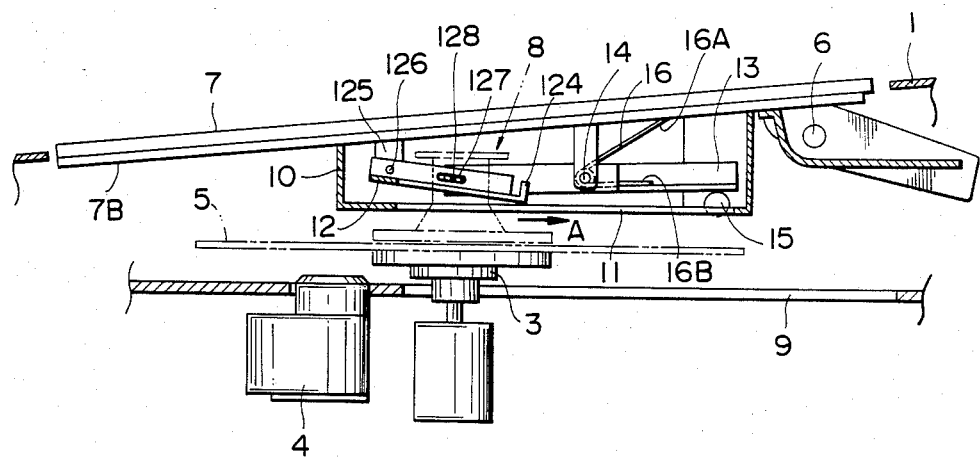
FIG. 5 is a side elevation showing control means permitting radial movement of the disk presser with the rotary cover closed.

When the cover 7 starts to be rotated about hinge 6 for opening, the abutting portion 131 of the holder arm 13 is moved away from the fixed pin 15 so that the arm 13 is rotated clockwise in FIGS. 3 and 5 under the resiliency of the spring 16 so that the pin 128 is lifted for rotating holder 12A. Thus the leading side 12A is lifted until the bent portions 124, 124 are engaged with the ring 8C of the disk presser 8 whereby the disk presser 8 is retained in the hole 123 of the holder 12. When the cover 7 is opened for sufficient exposure of the recess 2, disk presser 8 is restrained from shifting freely through the overall length of the long hole 11 but is maintained within a range to permit mating of the disk presser with the center spindle unit 3A of the disk table 3 during closure of the cover 7.

When the cover 7 is again rotated about hinge 6 for closure of the recess 2, after insertion or removal of the disk 5, the disk presser 8, is correctly mated with the center spindle unit 3A, from above the disk 5 placed on the disk table 3, due to retention of the disk presser 8 by the holder 12, so that the disk 5 may be positively chucked between the disk presser and the disk table 3.

It should be noted that, during closure of the cover 7, the abutting portion 131 of the holder arm 13 is brought into abutting contact with the fixed pin 15 for rotating the shaft 14 counterclockwise in FIGS. 3 and 5 against resiliency of the spring 16. Thus the side 13A of the holder arm is lowered so that the holder 12 is rotated clockwise about shaft 126 on account of the engagement between the pin 128 and the through-opening 127. Hence, the leading side 12A of the holder 12 is lowered so that the bent portions 124, 124 are receded to a position below the ring 8C of the disk presser 8 and the disk presser may be movable freely in the direction of the arrow mark A in FIGS. 4 and 5.

Therefore, with the rotary cover 7 thus closed, the apparatus is enabled for playback so that the disk 8 is rotated upon rotation of the disk table 3 by the spindle motor and the disk presser 8 is also moved in the direction of the arrow mark A shown in FIG. 1 upon movement of the disk table 3 in said direction with the disk 5 remaining chucked in place between disk presser 8 and disk table 3. When the optical pick-up device 4 is driven in this state, the object lens 4A of the pick-up unit is positioned in a facing relation to the lower side of the disk 5 for radially sequentially scanning the recording tracks on the disk surface starting from the innermost track.

In the neighborhood of the base portion 7A of the inner surface 7B of the rotary cover 7, which is mounted for closing the recess 2 in the main body 1, there is provided a guide plate 71 as means for guiding the disk introduced into said recess 2.

Figure 6:
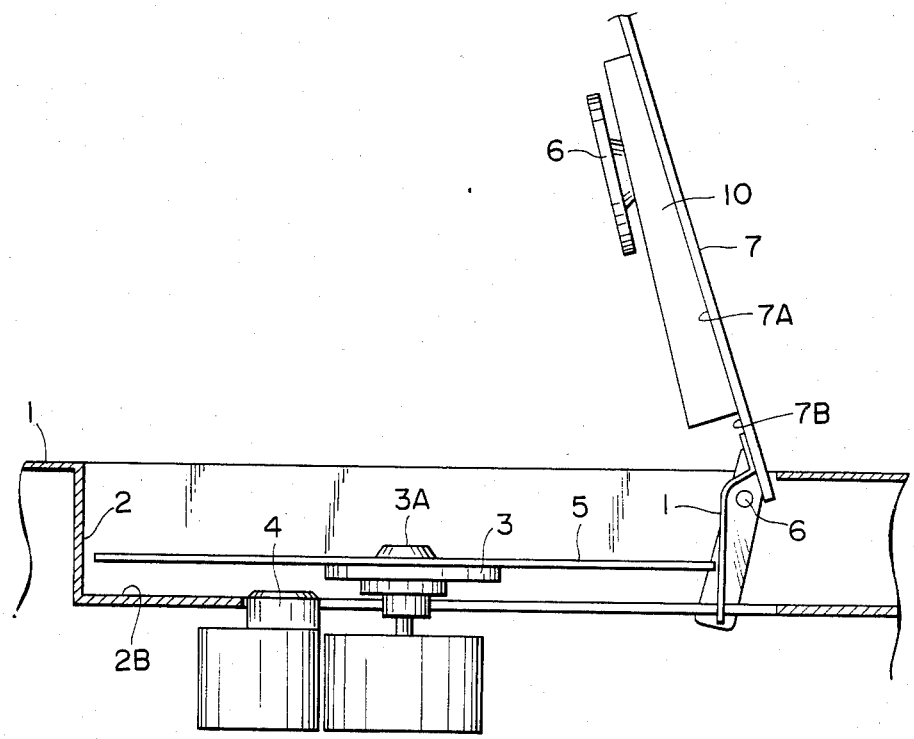
FIG. 6 is a side elevation showing the disk plate with the rotary cover open.

This guide plate 71 is mounted as a moveable depending end wall obstructing an excess forward movement of the disk in the recess 2 when the cover 7 is opened, that is, when the cover 7 is erected obliquely as shown in FIGS. 1 and 6. On the other hand, when the cover 7 is closed, the guide plate 71 is moved away from the position acting as said end wall. Thus the guide plate 71 is receded to a position in which a sufficient space is provided ahead of the disk 5 introduced into the recess 2 and thus the movement of the disk 5 and the disk table 3 is not obstructed by the presence of the guide plate 71.

In operation, when introducing a disk 5 on the disk table 3 in the recess 2 or removing the disk from the table 3, the pivoted cover 7 is manipulated to an open position. Since the pivoted cover 7 is extended obliquely upwardly along one side of the recess 2, it is difficult to insert or remove the disk 5 from a position directly above the disk table 3 which is maintained in the position permitting insertion of the disk 5. Thus the disk need be inserted or removed obliquely. When the disk is introduced to the disk table 3 obliquely, a portion of the periphery of the disk 5 abuts on the guide plate 71 then positioned as a depending end wall ahead of the disk thus facilitating the mating of the center spindle unit 3A of the disk table 3 with the center hole of the disk 5. Hence the guide plate 71 need be provided at a position such that the center hole of the disk is positioned in the range of the center spindle 3A of the disk table 3 when the disk 5 introduced into the recess 2 while the cover 7 remains opened abuts on the guide plate 71.

It should be noted that, when the cover 7 is closed for playback after the insertion and loading of the disk 5, the guide plate 71 is receded to an upper position shown in FIG. 5 in unison with the pivoting movement of the cover 7 to its closed position. Hence, the guide plate 71 does not prove to be hindrance to the movement of the disk table 3 in the direction of the arrow mark A.

In the above embodiment, the guide plate 71 is attached directly to the pivoted cover 7. Alternatively, the guide plate 71 may be provided as separate member and may be operatively associated with other movable members of the apparatus so as to be movable upon rotation of the cover 7 between a first position permitting insertion of the disk 5 and a second position receded from and hence not obstructing the radial movement of the disk 5.

I claim:

1. A recording and/or reproducing apparatus for a disk comprising;
    a main body having a recess formed therein for accommodating a disk,
    a cover movably mounted on said main body and being movable between a first position to open said recess and a second position to close said recess,
    a spindle unit for rotating a disk and being mounted on said main body for movement in a radial direction relative to said disk when said disk is being recorded and/or reproduced,
    a disk presser operatively mounted to said cover to cooperate with said spindle unit for holding said disk,
    holder means cooperating with said disk presser and being movably attached to said cover to limit movement of said disk presser to radial movement relative to said disk, and
    control means for moving said holder means to permit said disk presser to move with said spindle unit in said radial direction when said cover is in said second position.

2. The apparatus as claimed in claim 1 further comprising guide means for guiding said disk presser in said radial movement.

3. The apparatus as claimed in claim 1 wherein said spindle unit comprises an output shaft supporting a disk table for receiving a disk having a center hole, a magnet mounting plate mounted to the end of said output shaft carrying the disk table, and a disk centering plate slidably fitted on said output shaft, said disk centering plate being vertically movable between said magnet mounting plate and said disk table and biased to be moved vertically by a spring, and in which said disk is mounted to the spindle unit by the center hole thereof and chucked between the disk table and the disk presser by said disk presser being attracted towards said spindle unit, said disk presser further including a second magnet which is pressed from above the disk.

4. The apparatus as claimed in claim 1 further comprising a disk guide operable in unison with opening and closing of said cover so that said disk guide is in a corresponding first position when said cover is open or in a corresponding second position when said cover is closed, said disk guide operating to guide the disk introduced into said recess in said main body only when said disk guide is in said first position.

5. The apparatus as claimed in claim 4 wherein said disk guide is arranged close to the base of the inner surface of the cover to form a movable, depending end wall arranged ahead of a disk introduced into said disk housing recess when the cover is opened, said disk guide being raised away from a lower surface of the disk housing recess to a position not obstructing the movement of said disk table when the cover is closed.

6. The apparatus as claimed in claim 5, wherein said disk guide includes a disk guide plate element.

7. The apparatus as claimed in claim 2, wherein said guide means is mounted on an inside surface of said cover.

8. The apparatus as claimed in claim 3, wherein said at least one magnet of said disk presser and said at least one magnet mounted to said magnet mounting plate of said spindle unit are of opposite polarity and are mounted in confronting relationship, thereby to be attracted toward one another when said cover is closed in said second position.

9. A recording and/or reproducing apparatus for a disk comprising;
 a main body having a recess formed therein for accommodating a disk;
 a cover movably mounted on said main body for movement between a first position in which said recess is opened to a second position in which said recess is closed;
 a spindle unit movably mounted on said main body for movement in the radial direction relative to the disk;
 a disk presser operatively mounted on said cover to cooperate with said spindle unit for holding a disk;
 holder means for said disk presser means movably mounted to said cover for limiting movement of said disk presser means to said radial direction; and
 control means for moving said holder means to permit said disk presser means to move with said spindle unit in said radial direction when said cover is in said second position, wherein said disk presser means includes a cylindrical mid-portion and an upper ring portion and said holder means comprises a holder plate having an elongated hole of a width to permit passage of said cylindrical mid portion of the disk presser and to obstruct the passage of said upper ring of the disk presser, said hole opening on one side of said holder plate provided in turn with upright bent portions, a supporting shaft attached to an inner surface of said cover, said holder plate being pivotally mounted by said supporting shaft mounted to the inner surface of the cover in a manner so that said one side of the holder plate is movable vertically; and said control means comprises a rotary support shaft attached to an inner surface of said cover, and a holder arm pivotally mounted halfway by said rotary support shaft, said holder arm having a pin at one end projecting substantially parallel to said rotary support shaft and engaged in an opening in said holder plate and an abutting portion at the other end in abutment with a fixed pin mounted in said recess in said main body, a coil spring, said holder arm being biased by said coil spring coiled around said rotary support shaft of the holder arm, said holder plate being pivoted responsive to the opening or closure of the cover so that said one side of said holder plate is moved vertically.

10. The apparatus as claimed in claim 9 wherein said coil spring has one end abutting on and engaging with the inner surface of the cover and another end abutting on and engaging with said holder arm for biasing said holder arm into rotation, said one side of said holder plate being moved lower by said pin of said holder arm when the cover is closed, thereby releasing said disk presser being held by bent portions of said one side of said holder plate.

11. The apparatus as claimed in claim 9 wherein said coil spring is mounted for biasing said holder arm away from the fixed pin upon moving the cover to said first position, and wherein the pin engaging in the opening of the holder plate is raised and the bent portions provided at the leading side of the holder plate are raised for holding the disk presser in the elongated hole in said second holder.

12. The apparatus as claimed in claim 9, in which a disk includes a hole for mounting on said spindle unit and wherein said spindle unit includes a disk table for carrying the disk, a shaft on which said disk table is mounted, a magnet mounting plate arranged at an end of said shaft at which said disk table is mounted, a disk centering plate loosely fitted on said shaft and being vertically movable between said magnet mounting plate and said disk table, a spring interposed between said magnet mounting plate and said disk table for urging said disk centering plate upwardly, and at least one magnet mounted to said magnet mounting plate, and further wherein said disk presser means includes at least one magnet adapted to be attracted toward said at least one magnet mounted on said magnet mounting plate of said spindle unit when said cover is in said second, closed position.

13. The apparatus as claimed in claim 9, further comprising a disk guide operable in unison with opening and closing of said cover for guiding the disk introduced into said disk recess only when said cover is opened.

* * * * *